United States Patent [19]

Fritz

[11] Patent Number: 4,874,151

[45] Date of Patent: Oct. 17, 1989

[54] GAS PUMP LEVER HOLDING DEVICE

[76] Inventor: Terry Fritz, 20 Green, No. 3, St. Charles, Mo. 63303

[21] Appl. No.: 312,897

[22] Filed: Feb. 17, 1989

[51] Int. Cl.[4] .......................... G05G 5/06; F16K 31/00

[52] U.S. Cl. .................................... 251/90; 24/16 PB; 24/306; 74/526; 141/392; 224/901

[58] Field of Search ............. 24/16 R, 16 PB, 17 AD, 24/30.5 P, 265 WS, 442, 450; 128/DIG. 26; 141/392; 251/89, 90, 141; 224/901; 248/205.2; 74/525, 526

[56] References Cited

U.S. PATENT DOCUMENTS

| | | | |
|---|---|---|---|
| 4,088,136 | 5/1978 | Hasslinger et al. | 24/16 R |
| 4,220,302 | 9/1980 | Hampton et al. | 24/306 |
| 4,445,894 | 5/1984 | Kovacs | 128/DIG. 26 |
| 4,537,432 | 8/1985 | Meeks | 24/16 PB |
| 4,569,348 | 2/1986 | Hasslinger | 24/16 R |
| 4,712,766 | 12/1987 | Ehrenhalt | 251/90 |
| 4,759,963 | 7/1988 | Uso, Jr. et al. | 248/205.2 |
| 4,811,765 | 3/1989 | Giha | 251/90 |

*Primary Examiner*—George L. Walton

*Attorney, Agent, or Firm*—Rogers, Howell & Haferkamp

[57] ABSTRACT

An adjustable gas pump trigger lever holding device is adapted to be secured to an automatic gas pump nozzle having an operator's handle, a trigger lever below the handle that is manually adjusted between a closed and open position to regulate fluid flow from the nozzle, and a trigger guard extending from the handle and surrounding the trigger. The holding device comprises a flexible strap having first and second ends, where the strap is adapted to extend in a loop around the nozzle handle and the trigger of the nozzle that has been manually adjusted to a desired position for a desired rate of fluid flow from the nozzle. The strap has coupling members at its opposite ends to releasably secure the ends of the strap together to form a loop having a desired peripheral length extending around the nozzle handle and adjusted nozzle trigger to maintain the trigger in its adjusted position for the desired rate of fluid flow from the nozzle. A tab section is provided to facilitate the attachment of the holding device to the gas pump nozzle by the operator.

16 Claims, 1 Drawing Sheet

FIG. 1.
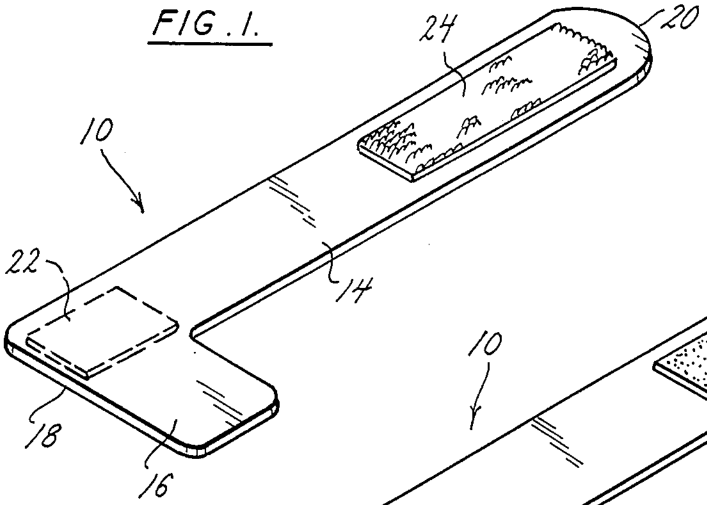
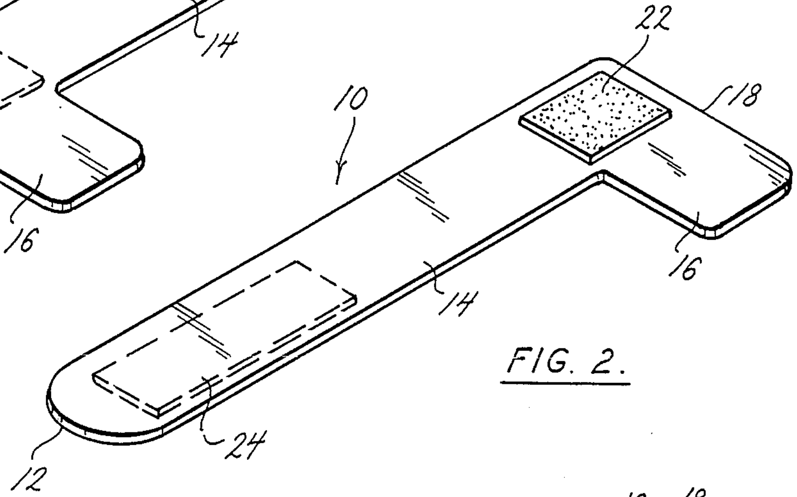
FIG. 2.
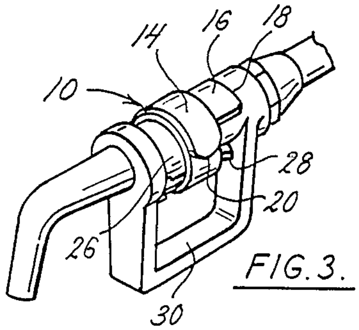
FIG. 3.
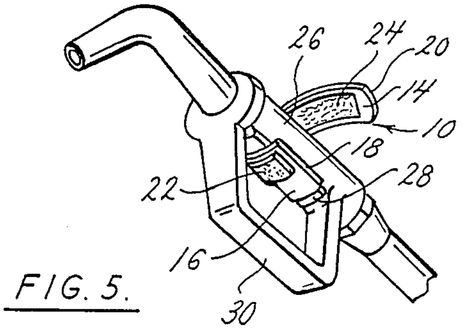
FIG. 5.
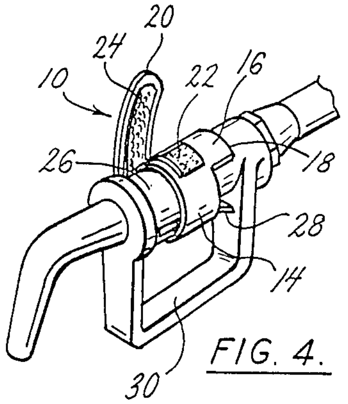
FIG. 4.

GAS PUMP LEVER HOLDING DEVICE

BACKGROUND OF THE INVENTION (1) Field of the Invention

This invention relates to an automatic gas pump lever holding device, in particular an adjustable device that is releasably attached to an automatic gas pump nozzle that maintains the trigger lever of the nozzle in a manually pre-set position.

(2) Description of the Related Art

Conventional automatic gas pump nozzles are designed for ease of operation to enable a purchaser to dispense a desired amount of fuel into his vehicle at a desired rate. A nozzles comprise a spout to be inserted into the vehicle fuel tank opening, a handle gripped by the operator, a trigger lever that is adjusted between a closed and fully opened position by the operator to adjust the fluid flow rate from the nozzle, and a trigger guard. Some nozzles also comprise a hinged regulator clip at a back portion of the trigger guard. The regulator clip can be pivoted forward by the operator to hold the trigger lever in several adjustment positions. Alternatively, some nozzles have a hinged pawl attached to the bottom of the trigger lever and a dog tooth rack fixed to the inside of the trigger guard. The pawl engages with several teeth of the rack as the trigger lever is adjusted and will maintain the trigger lever in several adjustment positions. Both of these trigger lever holding devices permit the operator to set the flow rate of the nozzle to a desired flow rate and enable the operator to perform other tasks such as vehicle maintenance.

However, many automatic gas pump nozzles are not equipped with either type of the above-described holding devices, and of those gas pump nozzles that are originally equipped with the devices, often the holding device is damaged or removed from the nozzle. Operation of these nozzles requires the operator to stand at the gas tank opening holding the nozzle trigger open the entire time it takes to fill the vehicle fuel tank.

The present invention solves this problem by providing a unique device that a gas pump operator can releasably attach to a conventional gas pump nozzle to hold the trigger lever of the nozzle in an adjusted position to dispense fuel at a desired rate, and frees the operator to perform other tasks such as vehicle maintenance.

It is therefore an object of the present invention to provide a gas pump lever holding device that is compact and is attached easily to an automatic gas pump nozzle by an operator to hold the trigger of the nozzle in a desired manually adjusted position to dispense gasoline into the operator's vehicle at a desired rate of fluid flow.

SUMMARY OF THE INVENTION

The gas pump lever holding device is adapted to be attached to a conventional automatic gas pump nozzle and to hold the trigger lever of the gas pump nozzle in a manually adjusted position to maintain a desired flow rate of fuel from the nozzle set by the operator.

The holding device comprises a flexible strap of a selected length appropriate to wrap around the nozzle from the top of the nozzle handle, around the bottom surface of the nozzle trigger lever with the trigger in its closed position, and back around to the top of the nozzle handle. A Velcro fastener is provided on the strap with the loop portion of the fastener fixed to a first end of the strap and the hook portion of the fastener fixed to the opposite second end of the strap. The hook portion of the fastener extends from the second end of the strap along the length of the strap a given distance toward the first end of the strap. The length of the hook portion of the Velcro fastener enables the loop portion of the fastener to be attached at different positions along the length of the hook portion of the fastener, thereby forming the flexible strap into loops of different peripheral lengths.

The holding device is formed in an L-shape with a tab section extending from the first end of the strap at a right angle to the strap. The tab provides a handle for the strap which facilitates its attachment to the gas pump nozzle. The tab also has a predetermined length which assists the operator in placing the holding device in an optimum position relative to the gas pump nozzle trigger for attachment of the holding device to the nozzle.

In use, the gas pump lever holding device is positioned in an optimum position relative to the gas pump nozzle by the operator, and the operator adjusts the trigger lever of the nozzle to a desired position for a desired flow rate of fuel from the nozzle. The operator maintains the first end of the strap in the optimum position by holding the tab portion to the top of the nozzle handle, while the second end of the strap is wrapped around the nozzle handle and below the adjusted nozzle trigger lever. The second end of the strap is then secured to the first end of the strap by attaching the hook portion of the Velcro fastener to the loop portion of the fastener. The loop formed by the strap in this manner maintains the trigger lever of the nozzle in its manually pre-set position and frees the operator to perform other tasks.

The gas pump lever holding device may also be positioned in an optimum position relative to the gas pump nozzle by the operator holding the device by the tab and positioning the device beneath the trigger lever with the strap forward of the tab and the tab parallel to the trigger. The operator holds the strap in this position and adjusts the nozzle trigger for the desired rate of fluid flow. After adjusting the trigger, the second end of the strap is wrapped around the top of the nozzle handle and back to the first end of the strap held beneath the trigger lever by the operator's hold on the tab. The second end of the strap is then attached to the first end of the strap to hold the trigger in the adjusted position for the desired rate of flow.

The flow rate of fuel from the nozzle can be adjusted by releasing the second end of the strap from its connection with the first end of the strap, manually repositioning the trigger lever of the nozzle for the new desired flow rate, and re-attaching the second end of the strap to the first end of the strap by attaching the hook portion of the Velcro fastener to the loop portion of the Velcro fastener. In this manner the peripheral length of the loop is adjusted to maintain the trigger lever of the gas pump nozzle in its new adjusted position.

BRIEF DESCRIPTION OF THE DRAWINGS

Further objects and features of the present invention are revealed in the following detailed description of the preferred embodiment of the invention and in the drawing figures wherein:

FIG. 1 is a perspective view generally of the inner side of the device;

FIG. 2 is a perspective view generally of the outer side of the device;

FIG. 3 is a perspective view of the device attached to a conventional automatic gas pump nozzle;

FIG. 4 is a perspective view of a first manner of attaching the device to a gas pump nozzle; and FIG. 5 is a perspective view of a second manner of attaching the device to a gas pump nozzle.

DESCRIPTION OF THE PREFERRED EMBODIMENT

The adjustable gas pump lever holding device of the present invention is shown in FIGS. 1 and 2. The overall configuration of the holding device is an L-shape with the longest section of the L being a strap section 14 having a length of approximately 9 inches. The shorter section of the L is a tab section 16 having a length of approximately 1½ inches from the edge of the strap section 14. The width of both the strap section 14 and tab section 16 preferably is about 1½ inches. The overall thickness of the holding device preferably is 1/16 of an inch. The holding device is constructed of a flexible material, and the preferred embodiment is constructed of vinyl.

The strap section 14 of the device has first and second ends 18 and 20. A Velcro fastener is fixed to the strap section 14 to enable connection of the first end 18 of the strap section 14 to the second end 20 of the strap section. The Velcro fastener is comprised of a first loop portion 22 fixed at the first end of the strap section 14 on the outer side of the strap, and a hook portion 24 fixed at the second end of the strap section 14 on the first side of the strap. The inner loop portion of the Velcro fastener is about 1¼ inches wide and extends 1½ inches along the length of the strap section 14 toward the second end 20 of the strap. The second hook portion 24 of the Velcro fastener is about 1 inch wide and extends about 3 inches from the second end 20 of the strap section 14 toward the first end 18 of the strap. All of the foregoing invention may be varied somewhat provided the unique characteristics of this device are preserved.

The first and second portions of the Velcro fastener are fixed to opposite sides of the strap 14 in order to enable the strap section to be formed into a loop when the first and second portions of the Velcro fastener are secured together. The second hook portion 24 of the Velcro fastener extends for a length of approximately 3 inches along the length of the strap section 14 to enable adjustment of the peripheral length of the loop formed by attaching the first portion 22 of the Velcro fastener at different positions along the length of the second portion 24 of the Velcro fastener. The length of the strap section 14 and the second portion 24 of the Velcro fastener are dimensioned to enable the operator of the holding device to form the strap section into a loop having a minimum peripheral length corresponding to the length of a loop wrapped around a gas pump nozzle handle 26 and nozzle trigger 28 with the trigger in its fully opened position, and having a maximum peripheral length corresponding to a loop wrapped around the nozzle handle 26 and the nozzle trigger 28 in its closed position.

The tab section 16 of the holding device extends for a length of approximately 1½ inches from the edge of the strap section 14 and is at a right angle to the strap section 14. The length of the tab section 16 permits it to be inserted by the operator under the nozzle trigger 28 and between the trigger guard 30 of a gas pump nozzle to position the strap section 14 forward of the tab section 16 in an optimum position for maintaining the position of a manually adjusted trigger lever 28 when secured around the trigger 28 and nozzle handle 26. The tab portion 16 also provides a handle for the holding device that enables an operator to position the holding device in a desired position relative to the gas pump nozzle at the top of the nozzle handle 26, and to wrap the strap section 14 around the nozzle handle and the adjusted trigger 28 to attach the first end 18 and second 20 end of the strap together without having the hand of the operator holding the tab portion 16 interfere with the attachment of the first 18 and second 20 ends of the strap 14.

FIG. 3 shows the gas pump lever holding device of the present invention attached to a conventional gas pump nozzle and holding the manually adjusted trigger lever of the nozzle in its adjusted position for a desired rate of fluid flow from the nozzle. Although it cannot be seen in this figure, the hook portion 24 of the Velcro fastener attached to the second end 20 of the strap portion 14 overlaps the loop portion 22 of the Velcro fastener attached to the first end 18 of the strap section 14 to form a loop of a desired peripheral length that maintains the nozzle trigger 28 in its manually adjusted position. As can be seen in FIG. 3, the tab section 16 provides a handle for the operator to position the holding device on the nozzle handle 26 while leaving the strap section 14 free to be formed into a tight loop around the nozzle handle 26 and adjusted nozzle trigger 28.

FIG. 4 depicts one manner of attaching the gas pump lever holding device to a conventional gas pump nozzle. The operator first positions the first end 18 of the device on the top of the nozzle handle 26 with the tab section 16 parallel to the nozzle handle 26 and the loop portion 22 of the Velcro fastener face up and forward of the tab section 16. Holding the tab section 16 in this position, the operator then adjusts the nozzle trigger lever 28 for the desired fluid rate of flow from the nozzle. The operator then takes the strap section 14 and wraps the strap section below the trigger lever 28 and around the opposite side of the nozzle handle 26 to attach the hook portion 24 of the Velcro fastener to the loop portion 22 of the fastener. Before attachment of the two portions of the fastener, the operator makes sure that the loop formed from the strap is tight in order to hold the trigger lever 28 of the nozzle in its adjusted position. The first and second portions 22 and 24 of the Velcro fastener are then secured together to form a loop from the strap 14 having a desired peripheral length to maintain the trigger lever 28 of the gas pump nozzle in its manually adjusted position for the desired rate of fluid flow from the nozzle.

When the desired amount of fluid is dispensed from the nozzle, the operator merely pulls on the second end 20 of the strap section 14 to release the hook portion 24 of the Velcro fastener from the loop portion 22, and then removes the gas pump lever holding device from the gas pump nozzle.

FIG. 5 depicts another manner of attaching the gas pump lever holding device to a conventional gas pump nozzle. In FIG. 5, the operator first positions the tab section 16 of the holding device beneath the trigger lever 28 of the gas pump nozzle with the first portion 22 of the Velcro fastener face down and forward of the tab section 16. With the tab section 16 in this position, and with the strap section 14 hanging loose out from the side of the nozzle, the operator then adjusts the trigger lever 28 of the gas pump nozzle to its desired position for the desires rate of fluid flow from the nozzle. Following adjustment of the trigger lever, the operator then wraps the strap section 14 of the holding device around the top of the nozzle handle 26 and down the opposite side of the nozzle handle toward the loop portion 22 of the Velcro fastener held by the operator under the trigger lever 28. The second end 20 of the strap is then pulled tight over the first end 18 of the strap and the hook portion 24 of the Velcro fastener is secured to the loop portion 22 of the fastener to form the strap section 14 into a loop having the desired peripheral length to hold the trigger lever 28 of the nozzle in its desired adjusted position. In attaching the gas pump lever holding device in this manner, the length of the tab section 16 is dimensioned to position the strap section 14 in an optimum position relative to the nozzle handle 26 and trigger lever 28 to provide a full range of adjustment of the trigger lever 28 from its fully opened position to its fully closed position. To release the holding device from the nozzle, the operator merely pulls on the second end 20 of the strap section 14 to release the hook portion 24 of the Velcro fastener from the loop portion 22 held stationary by the operator holding the tab section 16 against the trigger lever 28 of the nozzle. The operator then removes the gas pump lever holding device from the nozzle.

Although the preferred embodiment of the invention has been described as being constructed of vinyl and having approximate dimensions, it should be understood by those skilled in the art that various materials may be employed to construct the holding device and the holding device may be constructed having various dimensions without departing from the scope of the invention defined in the following claims.

Although described with reference to an automatic gas pump, it should also be understood by those skilled in the art that the gas pump lever holding device of the present invention may also be used with other types of pumps having manually adjusted nozzles.

What is claimed is:

1. An adjustable gas pump trigger lever holding device adapted to be secured to an automatic gas pump nozzle having an operator's handle and a trigger lever below the handle that is manually adjusted between a closed and open position to regulate fluid flow from the nozzle, the holding device comprising:

a flexible strap having first and second ends and of predetermined length, the strap being adpated to extend in a loop around the top of the nozzle handle and the bottom of a nozzle trigger that has been manually adjusted to a desired position for a desired rate of fluid flow from the nozzle;

coupling means adapted to releasably secure the first end of the strap to the second end of the strap to form a loop having a desired peripheral length extending around the top of a nozzle handle and the bottom of a nozzle trigger that has been manually adjusted to a desired position for a desired rate of fluid flow from the nozzle, thereby holding the nozzle trigger in the adjusted position; and a tab section extending from the strap, the tab being adapted to maintain the first end of the strap stationary relative to the gas pump nozzle when the tab is held stationary relative to the nozzle, thereby enabling the strap to be releasably secured to the nozzle by manipulating only the second end of the strap around the nozzle handle and trigger and securing it to the first end of the strap by the coupling means.

2. The holding device of claim 1 wherein:

the coupling means is adapted to releasably secure the first end of the strap to the second end of the strap to form a loop having a peripheral length that is adjustable.

3. The holding device of claim 2 wherein:

the coupling means comprises a first member fixed to the first end of the strap and a second member fixed to the second end of the strap, the first member being adapted to be releasably secured to the second member at a plurality of positions relative to the second member.

4. The holding device of claim 2 wherein:

the coupling means comprises a Velcro fastener having a first member fixed to the first end of the strap and a second member fixed to the second end of the strap, the first member being adapted to be releasably secured to the second member at a plurality of positions relative to the second member.

5. The holding device of claim 4 wherein:

the second member extends a predetermined distance along the length of the strap from the second end of the strap toward the first end of the strap, and the first member is adapted to be releasably secured to the second member at a selected position along the length of the second member to form the strap into the loop having the desired peripheral length.

6. The holding device of claim 2 comprising:

the peripheral length of the loop formed from the strap being adjustable between a minimum length that corresponds to a maximum obtainable fluid flow rate of the nozzle, and a maximum length that corresponds to a minimum obtainable fluid flow rate of the nozzle.

7. The holding device of claim 6 comprising:

the strap being adapted to adjust the fluid flow rate of the nozzle between its maximum and minimum rates in proportion to the adjustment of the peripheral length of the loop formed from the strap between its minimum and maximum lengths respectively.

8. The holding device of claim 1 comprising:

the tab section being of predetermined length suitable for being held by an operator's hand while that hand holds the nozzle trigger in the desired position and extending laterally from the first end of the strap.

9. The holding device of claim 8 wherein:

the length of the tab section combined with the width of the strap is dimensioned to position the strap in an optimum position relative to a nozzle trigger when the first end of the strap is inserted between the nozzle trigger and the trigger guard of the nozzle with the tab extending substantially parallel to the nozzle trigger.

10. The holding device of claim 8 wherein the gas pump nozzle has a trigger guard extending from the handle and surrounding the trigger:

the length of the tab section is dimensioned to position the strap at an optimum position forward of the tab relative to a nozzle trigger when the first end of the strap is positioned between the trigger and the trigger guard of the nozzle.

11. The holding device of claim 8 wherein:

the length of the tab section is determined to provide a tab of sufficient length to enable an operator to hold the holding device by the tab in a desired position relative to a nozzle trigger, and to secure the holding device to the nozzle by releasably securing the first end of the strap to the second end of the strap.

12. The holding device of claim 1 comprising:

the length of the strap being determined to at least extend from the top of the nozzle handle, around the nozzle trigger in its closed position, and back to the top of the nozzle handle.

13. An adjustable fluid pump trigger lever holding device adapted for use with an automatic fluid pump nozzle having an operator's handle, a trigger lever below the handle that is manually adjusted between a closed and open position to regulate fluid flow from the nozzle, and a trigger guard extending from the handle and surrounding the trigger, the holding device comprising:

a compact, portable coupling means separate from the pump nozzle, the coupling means having first and second ends and being adapted to be releasably secured to the pump nozzle by a pump nozzle operator to hold the nozzle trigger lever in an adjusted position for a desired rate of fluid flow from the nozzle, and the coupling means being adapted to be removed from the pump nozzle by the operator; and a positioning means extending from the coupling means, the positioning means being adapted to maintain the first end of the coupling means stationary relative to the pump nozzle when the positioning means is held stationary relative to the nozzle by a nozzle operator, thereby enabling the coupling means to be releasably secured to the nozzle by the operator manipulating only the second end of the coupling means around the nozzle handle and trigger and securing it to the first end of the coupling means.

14. The holding device of claim 13, comprising:

the positioning means having a predetermined length and extending substantially at a right angle from the first end of the coupling means.

15. The holding device of claim 13 comprising:

the coupling means being adapted to releasably secure the first end of the coupling means to the second end of the coupling means to form a loop having a peripheral length that is adjustable.

16. The holding device of claim 12 comprising:

the coupling means having a first member fixed to the first end of the coupling means and a second member fixed to the second end of the coupling means, the first member being adapted to be releasably secure to the second member at a plurality of adjusted positions relative to the second member.

* * * * *